United States Patent Office 2,943,098
Patented June 28, 1960

2,943,098

PREGNADIENES AND METHOD OF PREPARING THE SAME

Seymour Bernstein, Pearl River, N.Y., Robert H. Lenhard, Ridgefield Park, N.J., and William S. Allen, Pearl River, N.Y., assignors to American Cyanamid Company, New York, N.Y., a corporation of Maine No Drawing. Filed Feb. 13, 1957, Ser. No. 639,848

9 Claims. (Cl. 260—397.45)

This invention relates to 16α,17α,21-trihydroxy-9α-halo-1,4-pregnadiene-3,11,20-triones, lower alkanoyl derivatives thereof, and methods of preparing the same.

In a recent publication (J. Am. Chem. Soc. 78, 5693 [1956]), we described the 16α-hydroxy derivatives of 9α-halo-pregnadienes and concluded that 16α-hydroxylation abolishes the sodium retaining property of 9α-halopregnadienes without destroying their glucocorticoid activity. These compounds have been found to be highly active clinically without the undesirable side effect of causing edema, which is a property of many steroids in the past.

We have now found that when the 9α-halo-11β,16α-dihydroxy-1,4-pregnadienes are oxidized to the corresponding 11-keto derivatives, high activity and low side effects are retained and the products are, therefore, very useful clinically. The novel compounds of the present invention can be illustrated by the following general formula:

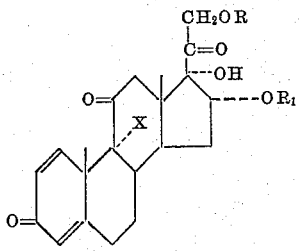

in which R and $R_1$ are members of the group consisting of hydrogen and lower alkanoyl radicals and X is a halogen atom.

The present compounds are relatively insoluble in water and somewhat soluble in organic solvents, such as ethyl acetate, methanol, ethanol, and the like. In general, they have relatively high melting points.

In the process of the present invention, a 16α,21-di lower alkanoyloxy-11β,17α-dihydroxy-9α-halo-1,4-pregnadiene-3,20-dione is dissolved in an amine, such as, for example, pyridine, and reacted with an oxidizing agent, such as chromic anhydride. The reaction is allowed to take place at a temperature of from 0 to 40° C. and is usually complete within a period of from six hours to 40 hours. After completion of the reaction, the desired product can be recovered and purified by mixing with ice water and extracting with a solvent. The product obtained by removal of the solvent is further purified by recrystallization.

The compounds of the present invention have glucocorticoid activity similar to hydrocortisone and, therefore, are valuable as anti-inflammatory agents in the treatment of arthritic, dermatological, ophthalmic, and allergic conditions.

The preparation of the compounds of the present invention are illustrated in greater detail by the following examples.

EXAMPLE 1

Preparation of 16α,21-diacetoxy-17α-hydroxy-9α-chloro-1,4-pregnadiene-3,11,20-trione To a chilled solution of 16α,21-diacetoxy-11β,17α-dihydroxy-9α-chloro-1,4-pregnadiene-3,20-dione (110 mg.) in pyridine (4 ml.), a solution of chromium trioxide (130 mg.) in pyridine (4 ml.) was added, and the mixture was allowed to stand at room temperature for 16 hours. The reaction mixture was then poured into ice water and extracted with ethyl acetate (400 ml.). The extract was washed two times with saturated sodium bicarbonate solution and two times with saturated saline, after which it was dried over anhydrous magnesium sulfate and then evaporated to dryness under reduced pressure. The resulting semi-solid material was subjected to chromatography over silica gel (10 g.). Chloroform eluted the desired product, which on crystallization from ethyl acetate-petroleum ether (90°–100° C.) gave 51 mg., melting point 228°–229° C. Recrystallization from the same solvent pair raised the melting point to 231°–232° C., infrared spectrum:

$\nu_{max}^{KBr}$ 3521, 1739, 1667, 1629, 1612 (shoulder), 1232, 1059 cm.$^{-1}$ Analysis.—Calc'd for $C_{25}H_{29}O_8Cl$ (492.94): C, 60.78; H, 5.92; Cl, 7.18. Found: C, 60.57; H, 6.29; Cl, 6.78.

EXAMPLE 2

Preparation of 16α,21-diacetoxy-9α-fluoro-17α-hydroxy-1,4-pregnadiene-3,11,20-trione A solution of 16α,21-diacetoxy-11β,17α-dihydroxy-9α-fluoro-1,4-pregnadiene-3,20-dione (200 mg.) in pyridine (5 ml.) was added to a slurry of chromic anhydride (150 mg.) in pyridine (2 ml.). After standing at room temperature (22°–25° C.) for twenty hours, the solution was poured into ice-water, and the precipitate was washed well with water. The organic residue was dissolved in ethyl acetate, and the inorganic residue was removed by filtration. The filtrate was washed with saturated saline, dried, and evaporated to afford a white crystaline solid. Crystallization from acetone-petroleum ether gave 126 mg. of product, melting point 228.5–233.5° C., with previous softening. Two additional crystallizations from acetone-petroleum ether gave 103 mg. of pure 16α,21-diacetoxy-9α-fluoro-17α-hydroxy-1,4-pregnadiene-3,11,20-trione, melting point 232°–234° C. with previous softening; ultraviolet: $\lambda_{max}$ 235mμ ($\epsilon$17,000) (abs. alc.); optical rotation: $[\alpha]_D^{25}$+82° (chloroform).

Analysis.—Calc'd for $C_{25}H_{29}O_8F$ (476.48): C, 63.01; H, 6.13; F, 3.99. Found: C, 63.22; H, 6.25; F, 4.01.

EXAMPLE 3

Preparation of 9α-chloro-16α,17α,21-trihydroxy-1,4-pregnadiene-3,11,20-trione

A mixture of 16α,21-diacetoxy-17α-hydroxy-9α-chloro-1,4-pregnadiene-3,11,20-trione (150 mg.) in methanol (20 ml.) containing sodium methoxide (35 mg.) was allowed to stand at room temperature under dry nitrogen gas for ten minutes. Glacial acetic acid (0.1 ml.) was added and the solvent evaporated under reduced pressure. The solid residue was slurred with water, filtered, and air dried.

We claim:
1. Compounds represented by the general formula:

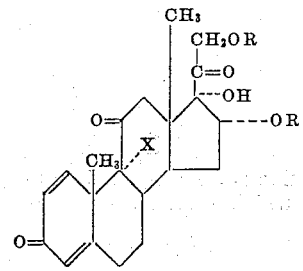

in which R is a member of the group consisting of a hydrogen atom and lower alkanoyl radicals both of which are the same and X is a halogen atom of the group consisting of chlorine and fluorine.

2. The compound 16α,21-diacetoxy-17α-hydroxy-9α-chloro-1,4-pregnadiene-3,11,20-trione.

3. The compound 16α,17α,21-trihydroxy-9α-chloro-1,4-pregnadiene-3,11,20-trione.

4. The compound 16α,21-diacetoxy-17α-hydroxy-9α-fluoro-1,4-pregnadiene-3,11,20-trione.

5. A method of preparing compounds having the general formula:

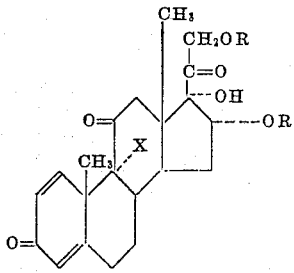

in which R is a lower alkanoyl radical and X is a halogen atom of the group consisting of chlorine and fluorine which comprises treating the corresponding 11β-hydroxy 1,4-pregnadiene with an oxidizing agent in the presence of a tertiary amine and recovering said product therefrom.

6. A method of preparing 16α,21-diacetoxy-17α-hydroxy-9α-chloro-1,4-pregnadiene - 3,11,20 - trione which comprises treating 16α,21-diacetoxy-11β,17α-dihydroxy-9α-chloro-1,4-pregnadiene-3,20-dione with chromium trioxide in the presence of pyridine.

7. A method of preparing 16α,21-diacetoxy-9α-fluoro-17α-hydroxy-1,4-pregnadiene-3,11,20-trione which comprises treating 16α,21-diacetoxy-9α-fluoro-11β,17α-dihydroxy-1,4-pregnadiene-3,20-dione with chromium trioxide in the presence of pyridine.

8. A method of preparing 16α,17α,21-trihydroxy-9α-chloro-1,4-pregnadiene-3,11,20-trione which comprises treating 16α,21-diacetoxy-11β,17α-dihydroxy - 9α - chloro-1,4-pregnadiene-3,20-dione with chromium trioxide in the presence of pyridine and subsequently hydrolyzing the resulting product under alkaline conditions.

9. A compound of the formula:

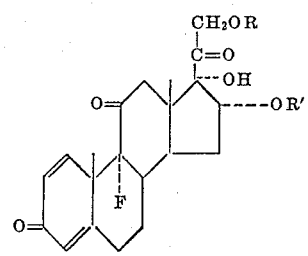

wherein R and R' are th same and are selected from the group consisting of hydrogen and lower alkanoyl radicals.

References Cited in the file of this patent
UNITED STATES PATENTS

| | | |
|---|---|---|
| 2,777,864 | Bernstein et al. | Jan. 15, 1957 |
| 2,788,354 | Agnello et al. | Apr. 9, 1957 |
| 2,789,118 | Bernstein et al. | Apr. 16, 1957 |